United States Patent Office 2,801,265
Patented July 30, 1957

---

2,801,265

DEHYDRATION OF VOLATILE FATTY ACIDS THROUGH SOLVENTS

Charles Coutor, Montigny-sur-Loing, France, assignor to Lambiotte & Co., Brussels, Belgium, a corporation of Belgium No Drawing. Application August 8, 1952, Serial No. 303,398

Claims priority, application France June 27, 1952

4 Claims. (Cl. 260—541)

The object of the present invention is the obtention of anhydrous volatile fatty acids from aqueous solutions of said acids, extracted through a solvent which also is volatile and non-miscible with water.

The present invention has, more particularly, for its object the obtention of anyhydrous volatile fatty acids from comparatively concentrated aqueous solutions of said acids (acid concentration <18%) extracted through a solvent which also is volatile and non-miscible with water.

A subsidiary object of the invention is to avoid too considerable a consumption of heat during the distillation of azeotropic mixtures comprising a solvent which is rich in water.

It is known to extract the volatile fatty acids (such as the formic, acetic, propionic, butyric acids) from their aqueous solutions by means of solvents which are non-miscible with water. To this end, solvents with a low boiling point such as ethyl oxide, isopropyl oxide, ethyl acetate, methyl propionate, tetrahydromethyl-furane are generally used, since they readily separate through distillation from the extracted fatty acid.

After the extraction, the acid which the aqueous solution initially contained, is passed into the solvent which, at the same time, has dissolved a quantity of water which is the larger the higher the acid concentration of the aqueous solution. Now, it is known that the best solvents for fatty acids are also those which dissolve the largest quantity of water. Thus, the extract of the acid in the solvent contains the more water the higher the initial acid concentration and the better the solvent.

Through a simple distillation of the solvent without any special precautions a residue is obtained which is not the anhydrous acid but an aqueous solution which is more or less concentrated according to the nature, the quantity of the solvent which is used and the initial concentration of the aqueous solution. Thus, under these conditions it is not possible to obtain an anhydrous acid with ethyl oxide.

If a solvent is chosen which gives with water a partially decantable azeotropic mixture, it is possible to separate the water from the extract by decantation from the distillates and this operation is generally sufficient for obtaining the anhydrous acid when the aqueous solutions to be extracted are very dilute and when they require the use of a large quantity of solvent. The problem is, however, quite different when the aqueous solutions to be extracted are rather concentrated as it is the case, for example, for the residual liquors which are obtained when manufacturing cellulose acetate and the pyroligneous liquids resulting from the carbonization of very dry woods. In such cases the proportion of water which is dissolved in the solvent with the help of the acid requires for the azeotropic dehydration a consumption of heat which is much superior to that strictly necessary to separate the solvent from the extracted acid. This deficiency in the extraction methods when applied to the concentrated aqueous solutions of volatile fatty acids is well known and this resulted in preference for other methods of concentration to said extraction methods.

Various means were heretofore suggested for partially removing the water of the extract, more particularly the adding of hydrocarbons, but it is not always easy to use them.

Now, according to the present invention, a simple and economical method was found for separating from an extract of a volatile fatty acid in a volatile solvent, when being distilled, the water which cannot be removed through azeotropic dehydration or which it is not desired to remove in this manner where the heat consumption would be too high.

The method which forms the subject-matter of the present invention consists in extracting a volatile fatty acid from its aqueous solution through a volatile solvent and the volatile extract thus obtained is distilled and refluxed while regularly withdrawing water which is not very acid and very slightly loaded with solvent at a temperature which must desirably lie between the boiling point of the hydrated solvent and at the upmost 100° C., the withdrawal being carried out in such a manner that the removed water forms a solution which is in every case, less acid than the aqueous solution initially treated with the solvent.

With an aim to work the method in accordance with the present invention, the distillation is conducted in the following manner.

The extract is continuously introduced onto one of the plates of a typical distillation column heated at its lower end and provided with a condenser at the top.

The distillation of the extract is conducted in the usual manner with reflux of the solvent at the top in order that the solvent which is collected be practically neutral, but water which is not very acid and which is very slightly loaded with solvent is pre-elevated from one of the plates of the column which is located higher than the inflow of the extract, for the only purpose of maintaining at this point a temperature which is preferably higher than the boiling point of the hydrated solvent but lower than 100° C. and for limiting the withdrawal in such a manner that the removed water be not more acid than the aqueous solution which was initially treated through extraction. When more liquid is withdrawn, the titration in acid increases.

If the solvent forms a decantable azeotropic mixture with water, it will be of advantage to arrange, as usual, a decanter at the top of the column in order to collect the neutral water coming from the azeotropic dehydration. This has for its consequence to reduce the quantity of acid water to be withdrawn from the column above the inflow point.

The choice of the plate from which the acid water is to be withdrawn and the temperature to be regulated at this point depend on the nature of the solvent and on the titration of the solutions to be extracted. Thus, for example, with ethyl acetate used as solvent and with an initial aqueous solution of acid of 18% the withdrawal will take place on the third plate above the inflow and the temperature will be adjusted at 90° C.

The interest of the method is due to the fact that certain solvents such as ethyl oxide, for example, do not provide a possible azeotropic dehydration of the extract and that other solvents as ethyl acetate or isopropyl oxide require a large consumption of heat for this dehydration because of the small proportion of decantable water in the azeotropic mixture.

The acid water which is withdrawn from the columns is added in order to be treated through extraction to a new portion of aqueous acid solution to be treated with the solvent and the resulting consumption of heat is much smaller than that which would be required by the azeotropic dehydration.

The invention will be more particularly described in the following examples:

*Example I*

Continuous extraction with ethyl acetate as a solvent, of the acetic acid of an aqueous solution with 25% of acid (A).

100 kgs. of solution (A) were treated in a countercurrent apparatus at 25° C. with 122 kgs. of ethyl acetate saturated with water and practically neutral. 62.3 kgs. of de-acidified water saturated with ethyl acetate were obtained on the one hand, and, on the other, 159.6 kgs. of extract containing:

|  | Kgs. |
|---|---|
| Ethyl acetate | 113.1 |
| Acetic acid | 25 |
| Water | 21.5 |

The extract was then continuously introduced into the lower third part of a distillation column the vapours of which are entirely condensed. The cooled condensate was passed through a continuous decanter from which:

10.6 kgs. of practically neutral water saturated with ethyl acetate, were extracted and 184.3 kgs. of ethyl acetate saturated with water and 70 kgs. of which were returned as reflux to the top of the column, while 114.3 kgs. were withdrawn in order to be returned to the extraction were extracted.

The decanted water was added to the 62.3 kgs. of water resulting from the extraction in order to exhaust the dissolved ethyl acetate therefrom through distillation. The solvent thus recovered was then added to the 114.3 kgs. coming from the distillation of the extract and the whole was anew available for the extraction of solution (A).

Contemporarily, a mixture of:

|  | Kgs. |
|---|---|
| Water | 7.7 |
| Acetic acid | 1.95 |
| Ethyl acetate | 1.8 | was withdrawn from a plate of the column for the distillation of the extract at the bottom of the superior third part of the column.

This mixture was continuously brought into the initial solution (A) to be treated.

At the end of the operations, all the water of the extract was separated through distillation and 23.05 kgs. of anhydrous acetic acid were collected at the bottom of the column.

The heating of the column was regulated so as to maintain a temperature of about 85° C. at the bottom of the superior third part of the column.

*Example II*

Extraction through ethyl ether as a solvent of the acetic acid from an aqueous solution with 25% of acid (B).

100 kgs. of aqueous solution (B) were treated in a countercurrent apparatus at the temperature of 25° C. with 252 kgs. of ether saturated with water. The following were obtained, on the one hand:

69.3 kgs. of de-acidified water saturated with ether, on the one hand and, on the other hand: 281.3 kgs. of extract containing:

|  | Kgs. |
|---|---|
| Ether | 241.5 |
| Acetic acid | 25 |
| Water | 14.8 |

The extract (E) thus obtained was then introduced continuously into the lower third part of a distillation column provided with a condenser with reflux.

245.1 kgs. of ether saturated with water and practically neutral were extracted from the top.

Contemporarily, a mixture of:

|  | Kgs. |
|---|---|
| Water | 10.8 |
| Acetic acid | 2.4 |
| Ether | 1.4 | was withdrawn from a plate of the columns for the distillation of the extract at the bottom of the superior third part of the column.

This mixture was brought continuously into the initial solution (B) to be treated.

At the end of the operations, all the water of the extract was separated through distillation and 22.6 kgs. of anhydrous acetic acid were collected at the bottom of the column.

The heating of the column was regulated so as to maintain a temperature of about 80° C. on the plate from which the water which was not very rich in acid was withdrawn.

The de-acidified water saturated with ether was exhausted through distillation; 5.1 kgs. of ether were recovered which, joined with the 245.1 kgs. coming from the distillation of the extract were anew available for the extraction of solution (B).

It may be seen that it was thus possible to entirely dehydrate extract (E) with the sole inconvenience that only 22.6 kgs. of anhydrous acetic acid could be obtained from the 25 kgs. initially contained in the aqueous solution, the remainder (2.4 kgs.) remaining in the aqueous solution, the remainder (2.4 kgs.) remaining in the aqueous solution with a concentration which is slightly lower than that of the initial solution which is withdrawn at the bottom of the upper third of the column.

In both preceding examples the titration of the withdrawn acid water was surveyed and the outflow was limited so that in no case the titration in acetic acid should exceed that of the initial aqueous solution to be treated.

What I claim is:

1. A method for the dehydration of the extracts through solvents of volatile fatty acids, which consists in extracting with a volatile low-boiling solvent a volatile fatty acid from an aqueous solution, distilling the extract thus obtained while refluxing and regularly withdrawing water not very acid and which is very slightly loaded with a solvent, at a point where the temperature is between the boiling point of the hydrated solvent and 100° C. in such a manner that the removed water forms a solution less acid than the aqueous solution initially treated with the solvent, the distillation taking place in a column with plates into which the extract is continuously introduced into the lower third part of said column, the withdrawal being effected in the vicinity of the bottom of the upper third part of the column, and returning the withdrawn side stream to the extraction zone.

2. A method according to claim 1 in which the volatile solvent forms an azeotropic mixture with water.

3. A method according to claim 1, in which the solvent is non-miscible with water.

4. A method according to claim 1, in which a member of the group consisting of ethyl oxide, isopropyl oxide, ethyl acetate, methyl propionate, and tetrahydromethylfurane is used at a temperature at which it is non-volatile.

References Cited in the file of this patent

UNITED STATES PATENTS

| 2,541,486 | Teeter et al. | Feb. 13, 1951 |
| 2,578,698 | Hanford | Dec. 18, 1951 |